(12) United States Patent
Kusafuka

(10) Patent No.: US 11,656,478 B2
(45) Date of Patent: May 23, 2023

(54) HEAD-UP DISPLAY, DISPLAY DEVICE FOR HEAD-UP DISPLAY, AND MOVING BODY

(71) Applicant: KYOCERA Corporation, Kyoto (JP)

(72) Inventor: Kaoru Kusafuka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/966,222

(22) PCT Filed: Jan. 30, 2019

(86) PCT No.: PCT/JP2019/003149
§ 371 (c)(1),
(2) Date: Jul. 30, 2020

(87) PCT Pub. No.: WO2019/151319
PCT Pub. Date: Aug. 8, 2019

(65) Prior Publication Data
US 2021/0048669 A1    Feb. 18, 2021

(30) Foreign Application Priority Data

Feb. 1, 2018   (JP) .............................. JP2018-016405

(51) Int. Cl.
*G02B 27/01*   (2006.01)
*G02B 30/31*   (2020.01)
(Continued)

(52) U.S. Cl.
CPC ......... *G02B 30/31* (2020.01); *G02B 27/0101* (2013.01); *G02B 30/20* (2020.01);
(Continued)

(58) Field of Classification Search
CPC ................ G02B 27/01; G02B 27/0101; G02B 27/0093; G02B 30/00; G02B 30/20;
(Continued)

(56) References Cited

U.S. PATENT DOCUMENTS

2008/0278808 A1\*  11/2008  Redert  ............... G02B 27/0075
359/478
2013/0135719 A1    5/2013  Tsai
(Continued)

FOREIGN PATENT DOCUMENTS

CN    102591025 A    7/2012
FR       2997515 A1 \*  5/2014   ............... B60R 1/00
(Continued)

*Primary Examiner* — Alexander Eisen
*Assistant Examiner* — Cory A Almeida
(74) *Attorney, Agent, or Firm* — Studebaker & Brackett PC

(57) ABSTRACT

A head-up display includes a first panel, a second panel, and an optical system. The first panel includes first subpixels arranged at a first pitch in a parallax direction, in which direction binocular parallax is provided to user's eyes. The second panel includes second subpixels arranged at a second pitch in the parallax direction. The second panel is placed along the first panel. The second panel is configured to produce, based on an image displayed on the first panel, a parallax image for providing binocular parallax to the user's eyes. The optical system enables the parallax image to be provided in enlarged dimension to the user's eyes. The first pitch and the second pitch are equal to each other.

14 Claims, 7 Drawing Sheets

(51) Int. Cl.
  *G02B 30/20* (2020.01)
  *G02B 30/32* (2020.01)
  *G02B 30/30* (2020.01)
  *G02B 30/26* (2020.01)
  *B60K 35/00* (2006.01)

(52) U.S. Cl.
  CPC .............. *G02B 30/26* (2020.01); *G02B 30/30* (2020.01); *G02B 30/32* (2020.01); *B60K 35/00* (2013.01); *G02B 2027/0134* (2013.01); *G02B 2027/0187* (2013.01)

(58) Field of Classification Search
  CPC ........ G02B 30/30; G02B 30/31; G02B 30/32; B60K 35/00
  See application file for complete search history.

(56) References Cited

U.S. PATENT DOCUMENTS

| | | | |
|---|---|---|---|
| 2013/0299082 A1 | 11/2013 | Yamazaki et al. | |
| 2016/0173867 A1* | 6/2016 | Ichihashi | G02B 30/30 348/54 |
| 2016/0327791 A1* | 11/2016 | Kasano | G02B 27/01 |

FOREIGN PATENT DOCUMENTS

| | | |
|---|---|---|
| JP | H07-287196 A | 10/1995 |
| JP | 2013-037264 A | 2/2013 |
| JP | 2013-235144 A | 11/2013 |
| JP | 2015-194709 A | 11/2015 |

\* cited by examiner

HEAD-UP DISPLAY, DISPLAY DEVICE FOR HEAD-UP DISPLAY, AND MOVING BODY

CROSS-REFERENCE TO RELATED APPLICATION

This application is a national stage entry according to 35 U.S.C. 371 of International Application No. PCT/JP2019/003149 filed on Jan. 30, 2019, which claims priority to Japanese Patent Application No. 2018-16405 filed on Feb. 1, 2018, the disclosures of which are entirely incorporated herein by reference.

TECHNICAL FIELD

The present disclosure relates to a head-up display, a display device for head-up display, and a moving body.

BACKGROUND

There is a heretofore known display including a barrier which defines the direction of image light for projection of a parallax image to user's eyes to give the user stereoscopic vision (refer to, for example, Japanese Unexamined Patent Publication JP-A 7-287196 (1995) (Patent Literature 1), etc.).

Patent Literature 1: Japanese Unexamined Patent Publication JP-A 7-287196 (1995)

SUMMARY

A head-up display in accordance with an embodiment of the disclosure includes a first panel, a second panel, and an optical system. The first panel includes first subpixels arranged at a first pitch in a parallax direction, in which direction binocular parallax is provided to user's eyes. The second panel includes second subpixels arranged at a second pitch in the parallax direction. The second panel is placed along the first panel. The second panel is configured to produce, based on an image displayed on the first panel, a parallax image for providing binocular parallax to the user's eyes. The optical system enables the parallax image to be provided in enlarged dimension to the user's eyes. The first pitch and the second pitch are equal to each other.

A moving body in accordance with an embodiment of the disclosure incorporates a head-up display including a first panel, a second panel, and an optical system. The first panel includes first subpixels arranged at a first pitch in a parallax direction, in which direction binocular parallax is provided to user's eyes. The second panel includes second subpixels arranged at a second pitch in the parallax direction. The second panel is placed along the first panel. The second panel is configured to produce, based on an image displayed on the first panel, a parallax image for providing binocular parallax to the user's eyes. The optical system enables the parallax image to be provided in enlarged dimension to the user's eyes. The first pitch and the second pitch are equal to each other.

A display device for head-up display in accordance with an embodiment of the disclosure includes a first panel and a second panel. The first panel includes first subpixels arranged at a first pitch in a first direction. The second panel includes second subpixels arranged at a second pitch in the first direction. The second panel is placed along the first panel. The second panel is configured to produce, based on an image displayed on the first panel, a parallax image for providing binocular parallax to user's eyes arranged in the first direction. The first pitch and the second pitch are equal to each other.

DETAILED DESCRIPTION

A display device for providing stereoscopic vision to a user may include a barrier as an active barrier realized by, for example, a liquid crystal panel. In this case, a black matrix disposed around pixels in a liquid crystal panel serving as a barrier may cause a decline in light transmittance in the barrier. This creates demands for a barrier which exhibits a higher level of light transmittance.

Figure 1:
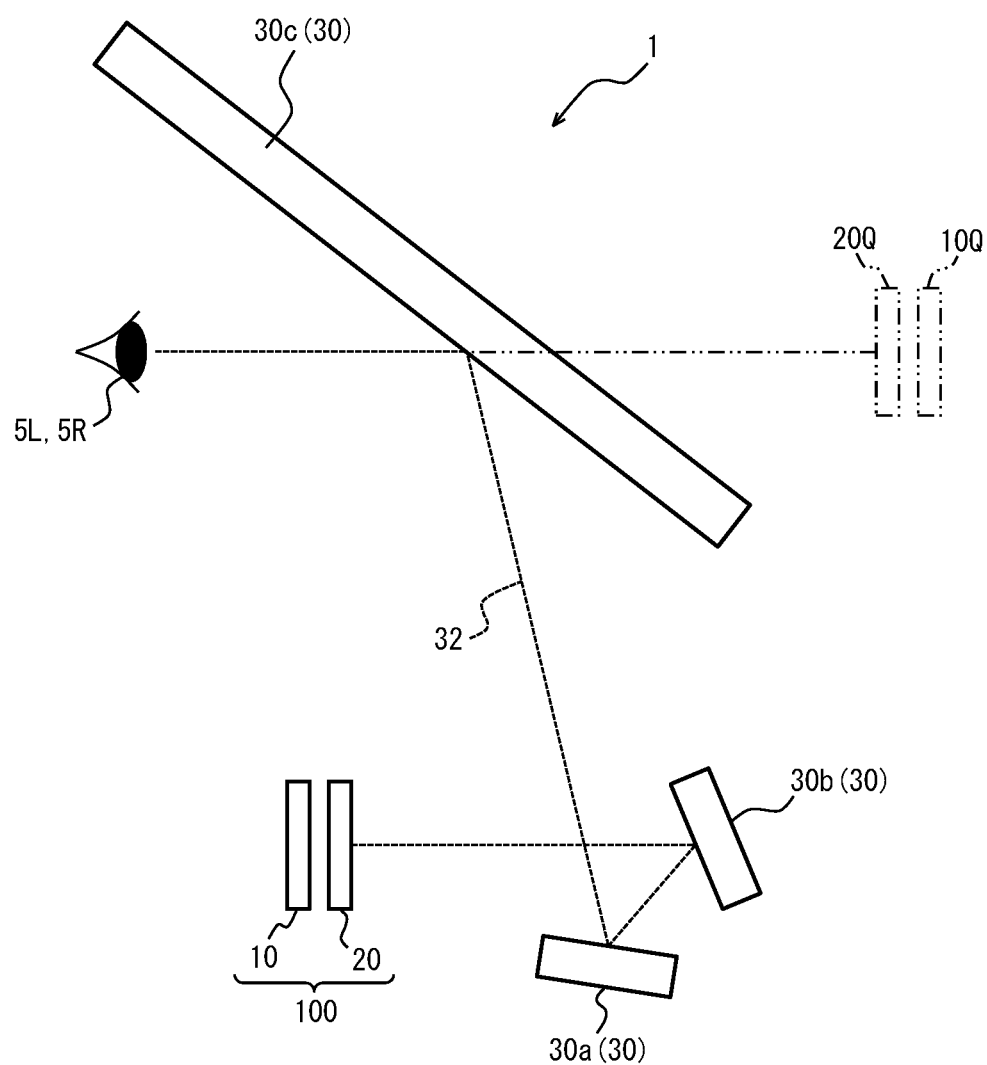
FIG. 1 is a view showing a constructional example of a head-up display according to an embodiment.

As shown in FIG. 1, a head-up display 1 according to an embodiment of the invention includes a display device 10, a barrier 20, and an optical system 30. The head-up display 1 may also be referred to as "HUD" (Head Up Display). In the head-up display 1, the display device 10 displays an image, and the barrier 20 blocks part of image light, so that different images can be projected to left and right eyes 5L and 5R of the user. That is, the head-up display 1 can project a parallax image to user's eyes. The parallax image can be said to be an image including a projected image for the left eye 5L of the user and a projected image for the right eye 5R of the user. On viewing the parallax image with his or her left eye 5L and right eye 5R, the user can see a stereoscopic image. The display device 10 and the barrier 20 may be combined to constitute a single display device for HUD 100.

The display device 10 displays a left-eye image to be projected to the left eye 5L of the user, and also displays a right-eye image to be projected to the right eye 5R of the user. For example, the display device 10 may include a liquid crystal device such as an LCD (Liquid Crystal Display). Alternatively, the display device 10 may include a self-luminous device such as an organic EL (Electro-Luminescence) display or an inorganic EL display. The barrier 20 is located between the display device 10 and the left and right eyes 5L and 5R of the user. The barrier 20 is arranged along the display device 10. The barrier 20, while permitting projection of the right-eye image displayed on the display device 10 to the right eye 5R of the user, inhibits projection of the right-eye image to the left eye 5L of the user. The barrier 20, while permitting projection of the left-eye image displayed on the display device 10 to the left eye 5L of the user, inhibits projection of the left-eye image to the right eye 5R of the user.

The optical system 30 is located in an optical path 32 over which image light emitted from the display device 10 and the barrier 20 travels to the left and right eyes 5L and 5R of the user. The optical system 30 focuses image light corresponding to a parallax image to project the parallax image to user's eyes. That is, the optical system 30 provides a parallax image to user's eyes. The optical system 30 may be configured to provide rescaled parallax images to user's eyes. The optical system 30 includes an optical member 30a, an optical member 30b, and an optical member 30c. The number of the optical members constituting the optical system 30 is not limited to three, and thus two or less, or four or more optical members may be provided. The optical member may include a reflective member including a convex mirror or a concave mirror. The optical member may include a refractive member including a convex lens or a concave lens. Examples of the convex lens include a biconvex lens, a planoconvex lens, and a convex meniscus lens. Examples of the concave lens include a biconcave lens, a planoconcave lens, and a concave meniscus lens. The optical member is not limited to the reflective member and the refractive member, and may thus include another different optical member.

A virtual image 10Q from the display device 10 and a virtual image 20Q from the barrier 20 are located directly ahead of a straight chain double-dashed line extending depth-wise from the nearest optical member 30c in a user's sight. The virtual image 10Q and the virtual image 20Q form a parallax image to be provided to user's eyes. That is, the user can visually recognize the virtual image 10Q and the virtual image 20Q as a parallax image. Thus, stereoscopic vision can be provided for the user.

Figure 2:
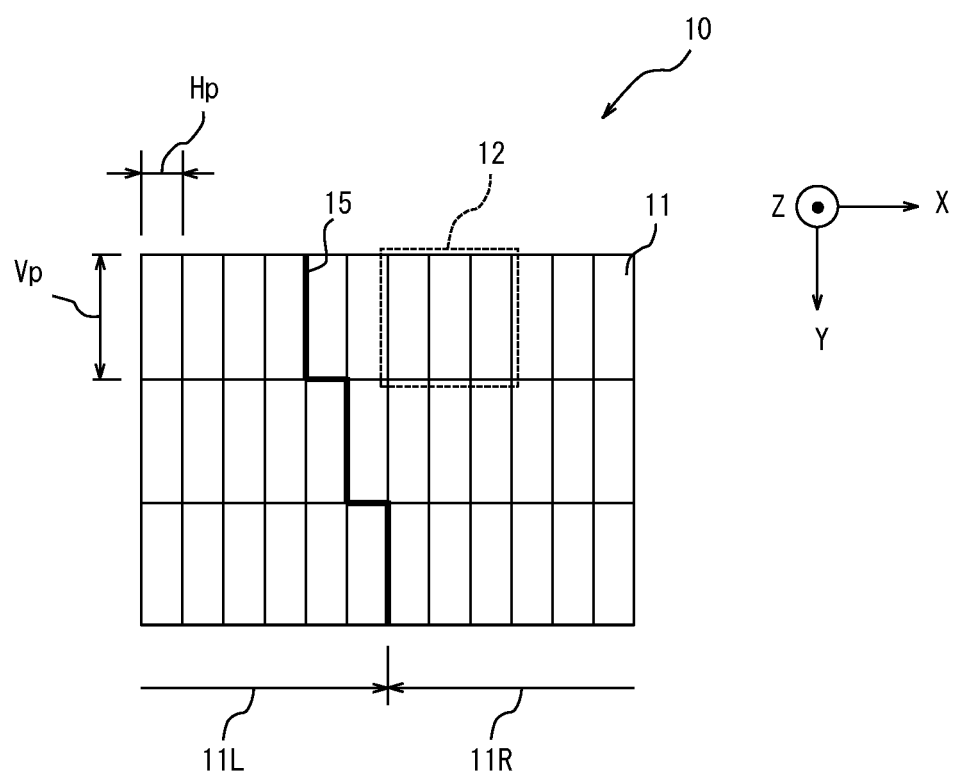
FIG. 2 is a view showing an example of arrangement of pixels in a display device.

As shown in FIG. 2, the display device 10 includes subpixels 11. The subpixels 11 may be arranged in grid form. In these embodiments, grid axes defining the matrix of the subpixels 11 are assumed to be an X axis and a Y axis. The subpixels 11 may be arranged at a predetermined pitch in an X-axis direction as well as in a Y-axis direction. The pitch of the subpixels 11 in the X-axis direction is designated by Hp, and the pitch of the subpixels 11 in the Y-axis direction is designated by Vp. In what follows, the pitch Vp is assumed to be greater than the pitch Hp.

A direction in which binocular parallax is provided to user's eyes is also referred to as "parallax direction". The parallax direction corresponds to the direction in which user's left eye 5L and right eye 5R are arranged. In these embodiments, the X-axis direction is assumed to conform to the parallax direction. The X-axis direction is also referred to as "horizontal direction" or "first direction". The Y-axis direction is also referred to as "vertical direction" or "second direction".

The subpixels 11 may constitute a pixel 12. The pixel 12 may comprise three subpixels 11 enclosed within dash outlines in the drawing. For example, the pixel 12 includes subpixels 11 representing different colors, namely R, G, and B. The number of the subpixels 11 constituting the pixel 12 is not limited to three, and thus two subpixels 11 or four or more subpixels 11 may be included. In the case where the display device 10 is built as a LCD, or an organic or inorganic EL display, each pixel may correspond to the subpixel 11 or the pixel 12. In these embodiments, the pixel 12 is assumed to include the subpixels 11 aligned in the horizontal direction. In other words, in these embodiments, the horizontal direction conforms to the direction of arrangement of the subpixels 11 constituting the pixel 12.

In these embodiments, it is assumed that the subpixels 11 constituting the pixel 12 are arranged side by side in a user's sight. In this case, the X-axis direction conforms to the direction of the side-by-side arrangement, i.e. the lateral direction, and the Y-axis direction conforms to the longitudinal direction. The ratio between the longitudinal length of the subpixel 11 and the lateral length of the subpixel 11 in a user's sight is also referred to as "aspect ratio of the subpixel 11". In this case, the aspect ratio is expressed as: Vp/Hp. The aspect ratio Vp/Hp will hereinafter be designated by x. In this case, the value of x is greater than 1.

The matrix of the subpixels 11 may be divided by a display boundary 15 in stepped configuration indicated by a heavy line. The position and the configuration of the display boundary 15 may be determined by the display device 10. The configuration of the display boundary 15 is not limited to that as shown in FIG. 2, and thus the display boundary 15 may have another configuration. The matrix of the subpixels 11 is divided by the display boundary 15 into a first region 11L and a second region 11R. The display device 10 may enable the first region 11L to display the left-eye image, and enable the second region 11R to display the right-eye image. The display boundary 15 may include a first display boundary indicating the range of the first region 11L and a second display boundary indicating the range of the second region 11R. This permits representation of subpixels 11 that are contained in neither of the first region 11L and the second region 11R.

Figure 3:
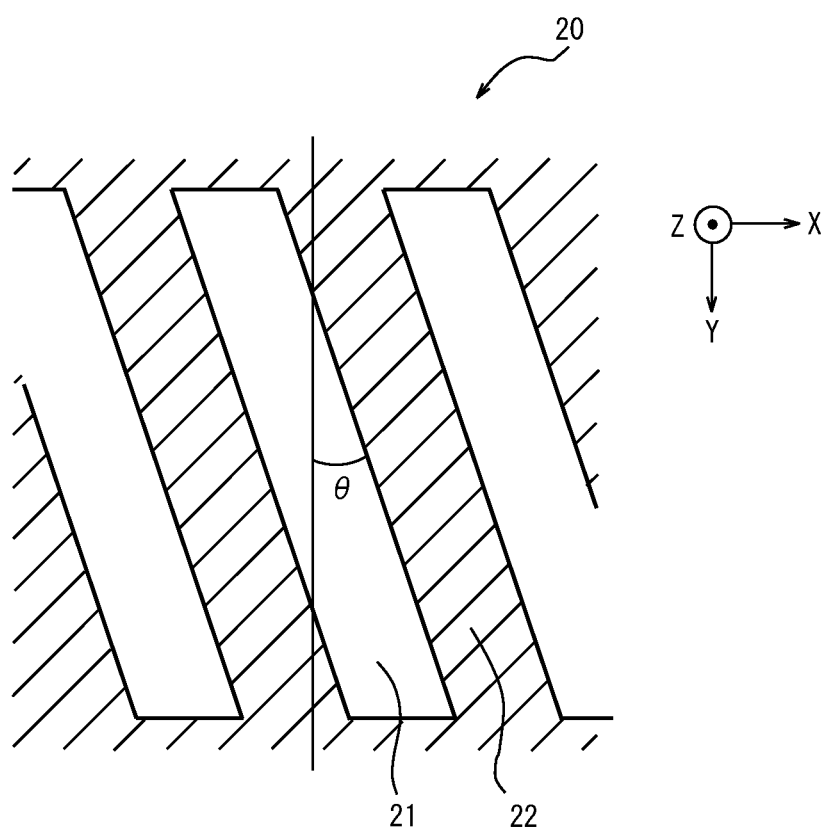
FIG. 3 is a view showing a constructional example of a barrier.

As shown in FIG. 3, the barrier 20 includes a light-transmitting region 21 and a light-blocking region 22. The light-transmitting region 21 allows light incident on the barrier 20 to pass therethrough. The light-transmitting region 21 permits transmission of light at a transmittance which is greater than or equal to a first predetermined value. For example, the first predetermined value may be set at 100%, or a value close to 100%. The light-blocking region 22 blocks light incident on the barrier 20. The light-blocking region 22 permits transmission of light at a transmittance which is less than or equal to a second predetermined value. For example, the second predetermined value may be set at 0%, or a value close to 0%.

The light-transmitting region 21 and the light-blocking region 22 are alternately arranged in the X-axis direction. The borderline between the light-transmitting region 21 and the light-blocking region 22 extends with inclination at a predetermined angle designated by θ with respect to the Y-axis direction. A line representing an end of the light-transmitting region 21 is also referred to as "end line of the light-transmitting region 21". The predetermined angle θ is also referred to as "barrier inclination angle". The angle θ may be greater than 0 degree, and less than 90 degrees.

The barrier 20 may be constructed of a liquid crystal shutter. The liquid crystal shutter can control the transmittance of light according to an applied voltage. The liquid crystal shutter, which includes pixels, may control the transmittance of light in each of the pixels. In the liquid crystal shutter, a region of high light transmittance or a region of low light transmittance may be formed in any given shape. In the case where the barrier 20 is constructed of a liquid crystal shutter, the light-transmitting region 21 may be a region having a light transmittance which is greater than or equal to the first predetermined value. Moreover, in the case where the barrier 20 is constructed of a liquid crystal shutter, the light-blocking region 22 may be a region having a light transmittance which is less than or equal to the second predetermined value.

The light-transmitting region 21 permits transmission of the left-eye image for projection of the left-eye image displayed on the display device 10 to the left eye 5L of the user, and also permits transmission of the right-eye image for projection of the right-eye image displayed on the display device 10 to the right eye 5R of the user. The light-blocking region 22 shields the left-eye image so as to inhibit projection of the left-eye image displayed on the display device 10 to the right eye 5R of the user, as well as shields the right-eye image so as to inhibit projection of the right-eye image displayed on the display device 10 to the left eye 5L of the user. That is, the barrier 20, while permitting projection of the right-eye image displayed on the display device 10 to the right eye 5R of the user, inhibits projection of the right-eye image to the left eye 5L of the user. Moreover, the barrier 20, while permitting projection of the left-eye image displayed on the display device 10 to the left eye 5L of the user, inhibits projection of the left-eye image to the right eye 5R of the user. The barrier 20 may be spaced by a predetermined distance away from the display device 10.

The structure of the barrier 20 may vary depending on whether a parallax image is projected to user's eyes via the optical system 30 or a parallax image is projected to user's eyes without using the optical system 30. The following describes how the display device 10 and the barrier 20 are to be seen in the case where a parallax image is projected to user's eyes without using the optical system 30 with reference to FIG. 4.

The left eye 5L and the right eye 5R of the user are assumed to be spaced by a distance designated by P away from the barrier 20. The pitch of the alternating arrangement of the light-transmitting region 21 and the light-blocking region 22 in the X-axis direction is also referred to as "barrier pitch" designated by j. The distance between the left eye 5L and the right eye 5R is also referred to as "interocular distance" designated by E. The distance from the barrier 20 to the display device 10 is also referred to as "gap" designated by g. The distance from each of the left eye 5L and the right eye 5R of the user to the display device 10 is designated by a.

The display device 10 includes a left-eye visible region 13L which is visible to user's left eye 5L via the light-transmitting region 21, and a left-eye shield region 14L which is invisible to user's left eye 5L due to the light-blocking region 22. The left-eye visible region 13L and the left-eye shield region 14L are alternately arranged in the X-axis direction. The position of a boundary between the left-eye visible region 13L and the left-eye shield region 14L is determined on the basis of the position of the end line of the light-transmitting region 21, the distance (P) from the barrier 20 to user's eyes, and the gap (g).

The display device 10 includes a right-eye visible region 13R which is visible to user's right eye 5R via the light-transmitting region 21, and a right-eye shield region 14R which is invisible to user's right eye 5R due to the light-blocking region 22. The right-eye visible region 13R and the right-eye shield region 14R are alternately arranged in the X-axis direction. The position of a boundary between the right-eye visible region 13R and the right-eye shield region 14R is determined on the basis of the position of the end line of the light-transmitting region 21, the distance (P) from the barrier 20 to user's eyes, and the gap (g).

In the display device 10, the left-eye visible region 13L may be formed by allowing the subpixels 11 located in the first region 11L (refer to FIG. 2) to display the left-eye image. In the display device 10, the right-eye visible region 13R may be formed by allowing the subpixels 11 located in the second region 11R (refer to FIG. 2) to display the right-eye image. In the case where the first region 11L and the second region 11R correspond to the left-eye visible region 13L and the right-eye visible region 13R, respectively, the display boundary 15 represents a boundary between the left-eye visible region 13L and the right-eye visible region 13R. That is, in the display device 10, the position of the display boundary 15 may be determined on the basis of the position of the end line of the light-transmitting region 21, the distance (P) from the barrier 20 to user's eyes, and the gap (g).

In the case where the left-eye visible region 13L and the right-eye visible region 13R at least partly overlap with each other in the X-axis direction, there may arise crosstalk which is a phenomenon in which part of the left-eye image is projected to the right eye 5R, or part of the right-eye image is projected to the left eye 5L. Crosstalk causes deterioration in the image quality of a parallax image projected to the user.

In the case where the left-eye visible region 13L and the right-eye visible region 13R are alternately arranged with no mutual overlap in the X-axis direction, the left eye 5L recognizes the left-eye image alone, and the right eye 5R recognizes the right-eye image alone, in consequence whereof there may result reduced crosstalk. As long as the left eye 5L recognizes only the left-eye image and the right eye 5R recognizes only the right-eye image, the distance (P) from the barrier 20 to user's eyes can be said to be an ideal viewing distance. The ideal viewing distance is also referred to as "OVD (Optimal Viewing Distance)".

The left-eye visible region 13L and the right-eye visible region 13R are each also referred to as "monocular dot group". The pitch of the arrangement of the monocular dot groups in the X-axis direction is also referred to as "monocular dot group pitch" designated by R. A combination of the left-eye visible region 13L and the right-eye visible region 13R is also referred to as "binocular dot group". The pitch of the arrangement of the binocular dot groups in the X-axis direction is also referred to as "binocular dot group pitch". Given that the distance P is OVD, then the binocular dot group pitch is twice the monocular dot group pitch, and is thus designated by 2R.

Figure 4:
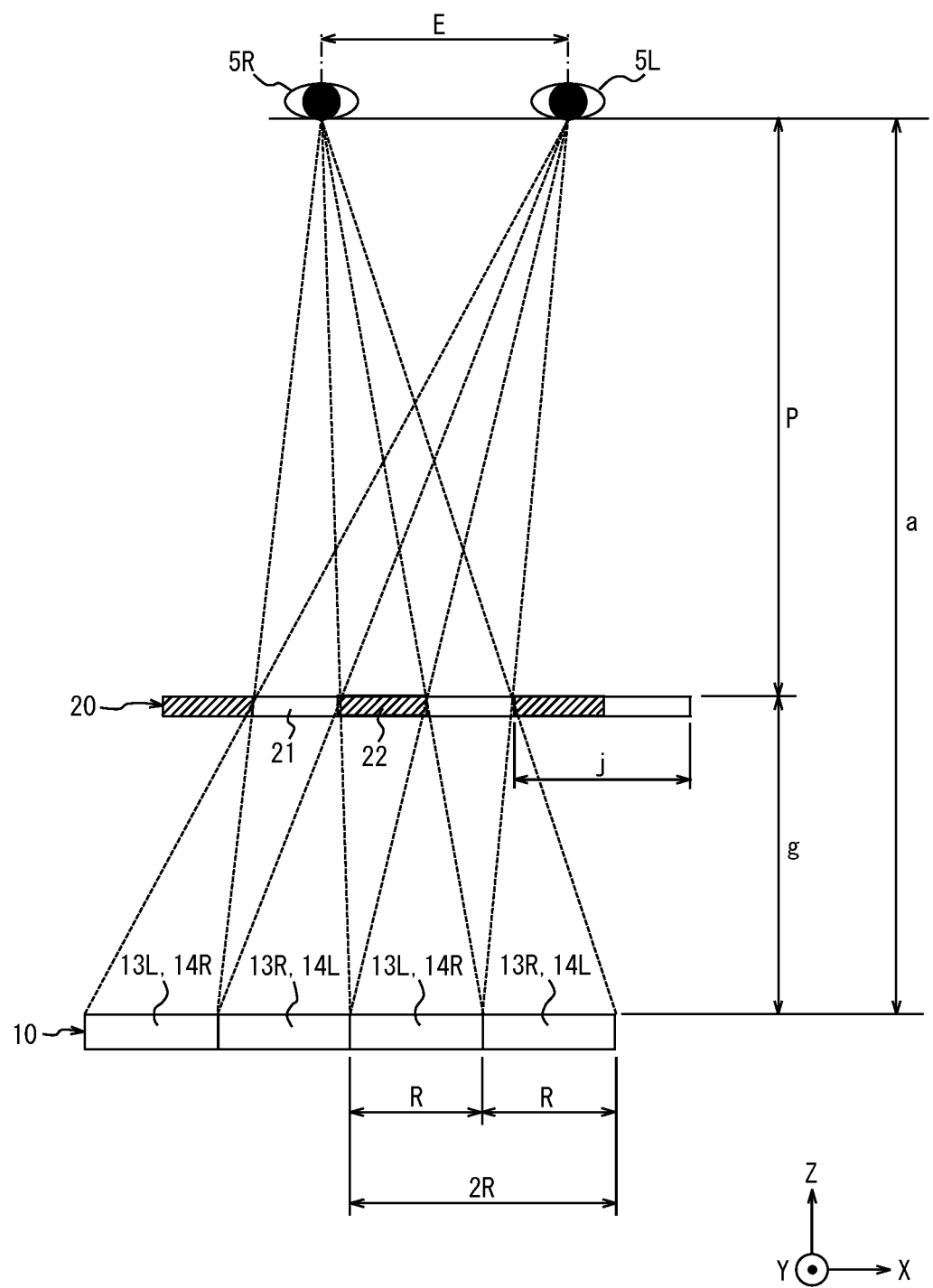
FIG. 4 is a view showing how the display device and the barrier are to be viewed by a user when a parallax image is projected to user's eyes without using an optical system.

In a constructional example as shown in FIG. 4, it is assumed that the distance P is OVD and the monocular dot groups are arranged with no mutual overlap in the X-axis direction. In this case, on the basis of the geometric positional relationship among user's eyes, the barrier 20, and the display device 10, a relationship defined by the following expressions (1) and (2) is satisfied. As used herein the term "geometric positional relationship" encompasses similitude relationship.

$$R = \frac{E \times g}{P} \tag{1}$$

$$j = \frac{2R \times P}{P + g} \tag{2}$$

The value R can be excluded according to the expressions (1) and (2). That is, the distance P, i.e. OVD, can be determined on the basis of the barrier pitch (j), the gap (g), and the interocular distance (E).

Figure 5:
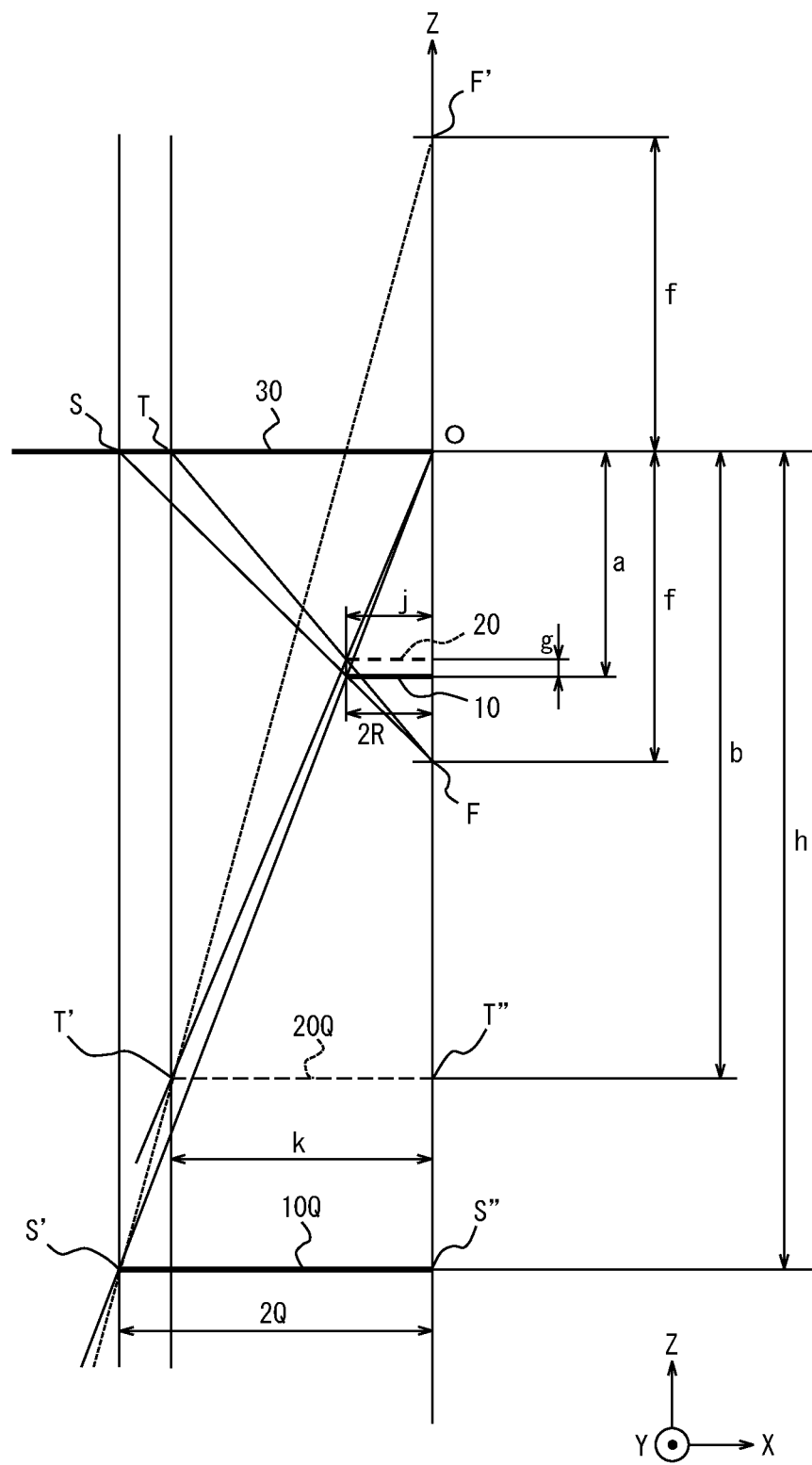
FIG. 5 is a view showing how a virtual image from the display device and a virtual image from the barrier are to be seen when a user views the barrier and the display device via the optical system.

On visually identifying the display device 10 and the barrier 20 through the optical system 30, the user can view each of a virtual image from the display device 10 and a virtual image from the barrier 20. The following describes how the virtual image 10Q from the display device 10 and the virtual image 20Q from the barrier 20 are to be viewed by the user with reference to a constructional example as shown in FIG. 5.

The display device 10, the barrier 20, and the optical system 30 are arranged along a Z axis. The optical system 30 is assumed to be a plane regardless of whether it includes only one optical member such as a lens or mirror or includes such optical members. The optical system 30 is assumed to lie within a plane passing through a point O and extending perpendicularly to the Z axis. The center of the optical system 30 is assumed to coincide with the point O. The optical axis of the optical system 30 is assumed to extend along the Z axis. The optical system 30 is represented as a line segment lying on the X axis. The line segment representing the optical system 30 is extended only leftward from the Z axis for purposes of convenience in illustration, but it may be extended rightward from the Z axis, too. The optical system 30 may be symmetrical about the Z axis. The optical system 30 has a focal point at a point F spaced by a distance f away from the point O in a negative direction along the Z axis, and a focal point at a point F' spaced by a distance f away from the point O in a positive direction along the Z axis. The distance f represents the focal length of the optical system 30. It is assumed that light traveling radially from the point F toward the optical system 30 undergoes refraction when passing through the optical system 30, and then travels in a direction parallel to the Z axis in a region located toward a positive side in the Z-axis direction beyond the optical system 30. That is, the optical system 30 collimates the light spreading radially from the point F.

The display device 10 is assumed to lie along a plane perpendicular to the Z axis spaced by a distance a away from the optical system 30 assumed to be a plane perpendicular to the Z axis in the negative direction along the Z axis. The display device 10 is represented as a line segment having a length corresponding to the binocular dot group pitch (2R).

The barrier 20 is assumed to lie along a plane perpendicular to the Z axis spaced by a distance g away from the plane where the display device 10 is located in the positive direction along the Z axis. The barrier 20 is represented as a line segment having a length corresponding to the barrier pitch (j).

A straight line connecting the point F and one of the ends of the line segment representing the display device 10, as well as a straight line connecting the point F and the other one of the ends, intersects the line segment representing the optical system 30 at corresponding one of the point O and a point S. That is, the line segment corresponding to the binocular dot group pitch in the display device 10 is enlarged to a line segment O-S, as viewed through the optical system 30 from the positive side in the Z-axis direction.

A straight line connecting the point O and an end point of the line segment representing the display device 10 which is opposite to the end point thereof lying on the Z axis intersects a straight line passing through the point S and extending in parallel with the Z axis at a point S'. A perpendicular line extending perpendicularly from the point S' to the Z axis intersects the Z axis at a point S". The line segment S'-S" represents the virtual image 10Q from the display device 10. The distance between the point O and the point S" is designated by h. That is, when the user views the display device 10 through the optical system 30, the virtual image 10Q is spaced by the distance h away from the point O in the negative direction along the Z axis. The length of the line segment S'-S", which is equal to the length of the line segment O-S, corresponds to the binocular dot group pitch in the virtual image 10Q. The binocular dot group pitch in the virtual image 10Q is designated by 2Q. The binocular dot group pitch in the virtual image 10Q is an enlarged pitch relative to the binocular dot group pitch in the display device 10.

A straight line connecting the point F and one of the ends of the line segment representing the barrier 20, as well as a straight line connecting the point F and the other one of the ends, intersects the line segment representing the optical system 30 at corresponding one of the point O and a point T. That is, the line segment corresponding to the barrier pitch is enlarged to a line segment O-T, as viewed through the optical system 30 from the positive side in the Z-axis direction.

A straight line connecting the point O and an end point of the line segment representing the barrier 20 which is opposite to the end point thereof lying on the Z axis intersects a straight line passing through the point T and extending in parallel with the Z axis at a point I'. A perpendicular line extending perpendicularly from the point I' to the Z axis intersects the Z axis at a point T". The line segment T'-T" represents the virtual image 20Q from the barrier 20. The distance between the point O and the point T" is designated by b. That is, when the user views the barrier 20 through the optical system 30, the virtual image 20Q is spaced by the distance b away from the point O in the negative direction along the Z axis. The length of the line segment T'-T", which is equal to the length of the line segment O-T, corresponds to the barrier pitch in the virtual image 20Q. The barrier pitch in the virtual image 20Q is designated by k. The barrier pitch in the virtual image 20Q is an enlarged pitch relative to the barrier pitch in the barrier 20.

The virtual image 10Q from the display device 10 and the virtual image 20Q from the barrier 20 form a parallax image to be provided to user's eyes. The following describes how the virtual image 10Q and the virtual image 20Q are to be seen in the case where a parallax image is projected to user's eyes via the optical system 30 with reference to a constructional example as shown in FIG. 6.

The distance between the optical system 30 and user's left eye 5L and right eye 5R is designated by P. The user visually recognizes the virtual image 10Q from the display device 10 and the virtual image 20Q from the barrier 20 through the optical system 30. The barrier pitch in the virtual image 20Q is designated by k. The monocular dot group pitch and the binocular dot group pitch in the virtual image 10Q are designated by Q and 2Q, respectively. The distance between the virtual image 10Q and the virtual image 20Q is designated by m. The distance between the optical system 30 and the virtual image 10Q is designated by h. The distance between the optical system 30 and the virtual image 20Q is designated by b.

Figure 6:
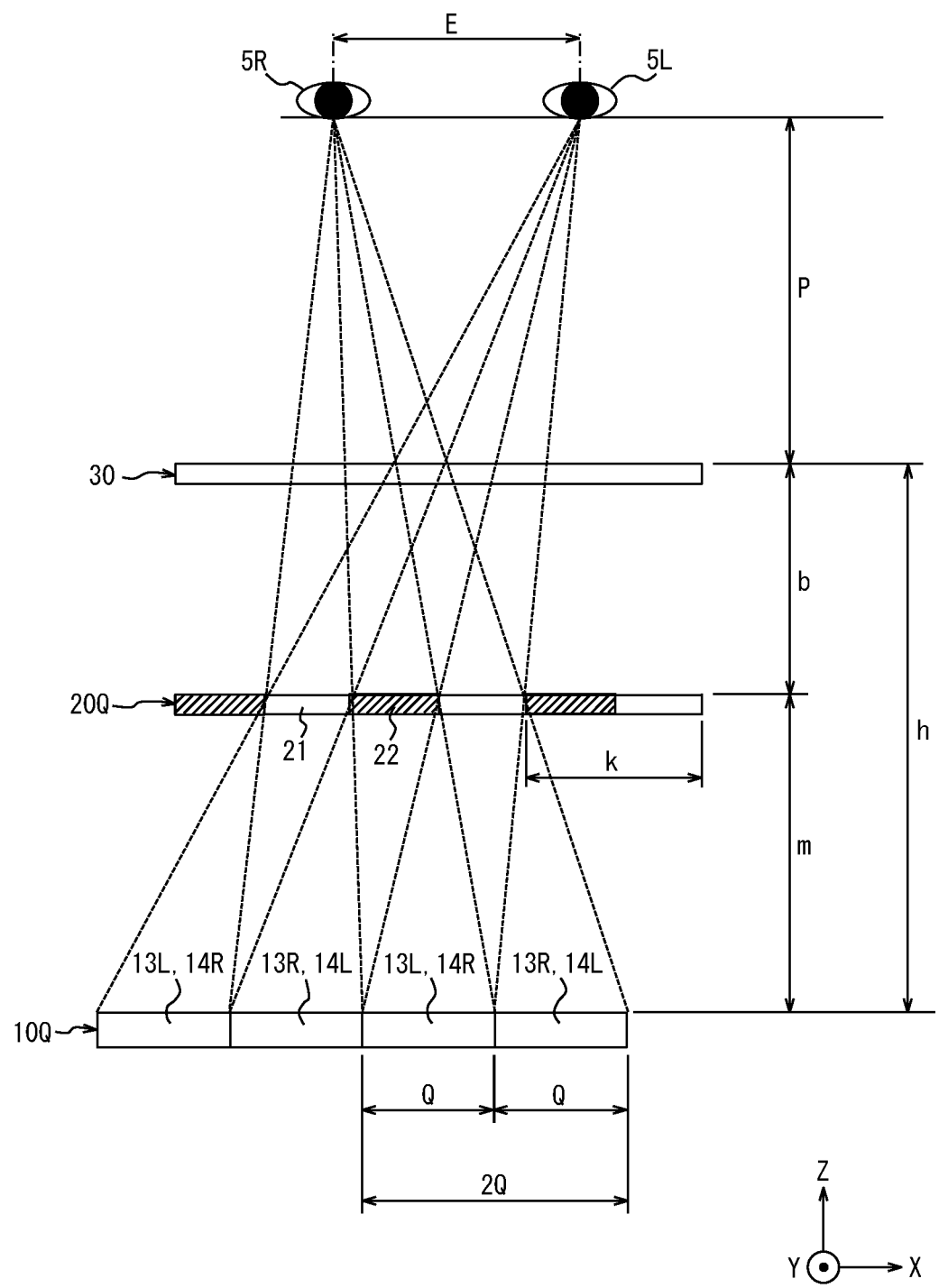
FIG. 6 is a view showing how a virtual image is to be viewed by a user when a parallax image is projected to user's eyes via the optical system.

In the constructional example shown in FIG. 6, it is assumed that the monocular dot groups in the virtual image 10Q from the display device 10 are arranged with no mutual overlap in the X-axis direction. In this case, on the basis of the geometric positional relationship among user's eyes, the virtual image 20Q, and the virtual image 10Q, a relationship defined by the following expressions (3) and (4) is satisfied. As used herein the term "geometric positional relationship" encompasses similitude relationship.

$$Q = \frac{m}{P+b} \times E \quad (3)$$

$$k = 2 \times Q \times \frac{P+b}{P+h} \quad (4)$$

In FIG. 5, a triangle whose vertices are respectively defined by the ends of the line segment representing the barrier 20 and the point F and a triangle whose vertices are respectively defined by the point O, the point T, and the point F are in similitude relation to each other. On the basis of the similitude relationship, the relationship between the barrier pitch (j) in the barrier 20 and the barrier pitch (k) in the virtual image 20Q is defined by the following expression (5).

$$j = \frac{k \times (f - a + g)}{f} \quad (5)$$

In FIG. 5, a triangle whose vertices are respectively defined by the ends of the line segment representing the display device 10 and the point F and a triangle whose vertices are respectively defined by the point O, the point S, and the point F are in similitude relation to each other. On the basis of the similitude relationship, the relationship between the binocular dot group pitch (2R) in the display device 10 and the binocular dot group pitch (2Q) in the virtual image 10Q is defined by the following expression (6).

$$2Q = 2R \times \frac{f}{f-a} \quad (6)$$

The barrier pitch (j) is defined by the following expression (7) according to the expression (4), the expression (5), and the expression (6).

$$j = 2R \times \frac{f}{f-a} \times \frac{f-a+g}{f} \times \frac{P+b}{P+h} \quad (7)$$

The distance from user's eyes to the virtual image 20Q from the barrier 20 (P+b) is defined by the following expression (8) according to the expression (3) and the expression (6).

$$P + b = m \times E \times \frac{f-a}{R \times f} \quad (8)$$

The distance between the virtual image 20Q and the virtual image 10Q (m) is defined by the following expression (9) with reference to FIG. 5.

$$m = h - b = a \times \frac{f}{f-a} - (a-g) \times \frac{f}{f-a+g} \quad (9)$$

As indicated by the following expressions (10) and (11), the enlargement factor of the virtual image 10Q with respect to the display device 10 is defined as A, and the enlargement factor of the virtual image 20Q with respect to the barrier 20 is defined as B.

$$A = \frac{f}{f-a} \quad (10)$$

$$B = \frac{f}{f-a+g} \quad (11)$$

The barrier pitch (j) is defined by the following expression (12) according to the expressions (7) to (11).

$$j = 2R \times \frac{A}{B} \times \frac{m \times E \times \frac{1}{A} \times \frac{1}{R}}{m \times E \times \frac{1}{A} \times \frac{1}{R} + m} = 2R \times \frac{A}{B} \times \frac{1}{1 + \frac{A \times R}{E}} \quad (12)$$

The expression (12) representing the relationship between the barrier pitch (j) and the binocular dot group pitch (2R) is set as the condition necessary for the monocular dot groups in the virtual image 10Q to be arranged with no mutual overlap in the X-axis direction. In the case where the expression (12) is satisfied, a parallax image derived from the virtual image 10Q and the virtual image 20Q can be provided to user's eyes with little crosstalk.

In the case where the expression (12) is satisfied, the condition necessary for the barrier pitch (j) and the binocular dot group pitch (2R) to be equal is defined by the following expression (13).

$$\frac{A}{B} = 1 + \frac{A \times R}{E} \quad (13)$$

The expression (13) is transformed to the expressions (14) and (15) according to the definitions A and B.

$$R = \left(\frac{A}{B} - 1\right) \times \frac{E}{A} = \left(\frac{1}{B} - \frac{1}{A}\right) \times E = \left(\frac{f-a}{f} - \frac{f-a+g}{f}\right) \times E = \frac{g}{f} \times E \quad (14)$$

$$g = \frac{R \times f}{E} \quad (15)$$

The barrier pitch (j) and the binocular dot group pitch (2R) can become equal when the expression (14) or the expression (15) is satisfied. That is, in the case where the condition necessary for the monocular dot groups to be arranged with no mutual overlap in the X-axis direction is satisfied and the expression (14) or the expression (15) is further satisfied, then a relationship given as: j=2R is satisfied.

In the case where a parallax image is projected to user's eyes without using the optical system 30 (refer to FIG. 4), the condition necessary for the monocular dot groups to be arranged with no mutual overlap in the X-axis direction encompasses the condition defined by the expression (2). According to the expression (2) wherein g is greater than 0, the fulfillment of a relationship given as: j≠2R is set as the condition necessary for the monocular dot groups to be arranged with no mutual overlap in the X-axis direction. On the other hand, when a parallax image is projected in enlarged dimension to user's eyes via the optical system 30 and, in addition, the expression (14) or the expression (15) is satisfied, then the fulfillment of the relationship given as: j≠2R is no longer the condition necessary for the monocular dot groups to be arranged with no mutual overlap in the X-axis direction. Expressed differently, so long as a parallax image is projected to user's eyes via the optical system 30, the monocular dot groups can be arranged with no mutual overlap in the X-axis direction even in the case where the relationship given as: j=2R is satisfied.

In the case where the optical system 30 enables the parallax image to be projected in enlarged dimension to user's eyes, the virtual image 10Q corresponds to a scaled-up representation of the display device 10, and the virtual image 20Q corresponds to a scaled-up representation of the barrier 20. In other words, the optical system 30 enlarges the barrier pitch (j) and the binocular dot group pitch (2R) at different enlargement factors from each other to cause a difference between the binocular dot group pitch (2Q) in the virtual image 10Q and the barrier pitch (k) in the virtual image 20Q.

Figure 7:
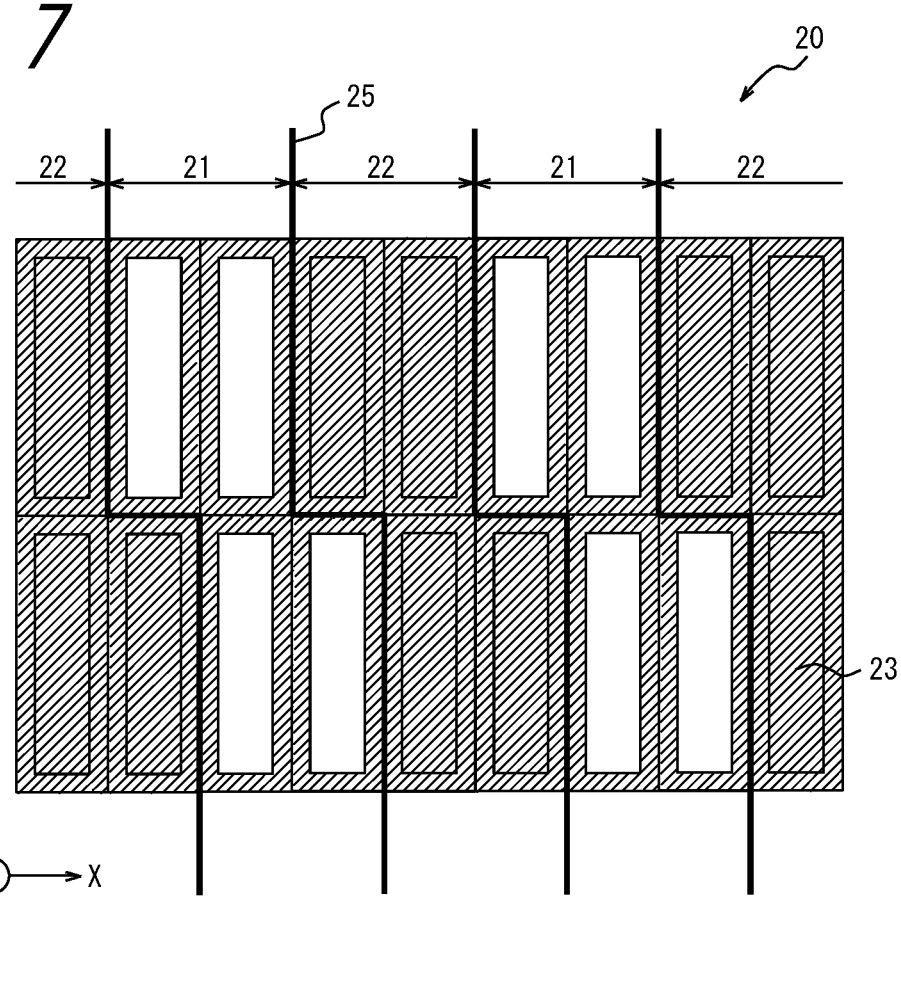
FIG. 7 is a view showing an example of arrangement of subpixels in the barrier.

The barrier 20 may be constructed of a liquid crystal panel. As shown in FIG. 7, the barrier 20 may include subpixels 23. The subpixels 23 may be arranged in grid form. Grid axes defining the matrix of the subpixels 23 are assumed to be an X axis and a Y axis. The subpixels 23 may be arranged at a predetermined pitch in an X-axis direction as well as in a Y-axis direction. The barrier 20 may include subpixels 23 corresponding to the light-transmitting region 21 and subpixels 23 corresponding to the light-blocking region 22. The subpixel 23 corresponding to the light-transmitting region 21 is controlled into a state where a liquid crystal shutter is opened. The subpixel 23 corresponding to the light-blocking region 22 is controlled into a state where a liquid crystal shutter is closed. The region where the subpixels 23 corresponding to the light-transmitting region 21 are arranged and the region where the subpixels 23 corresponding to the light-blocking region 22 are arranged may be separated by a control boundary 25. The barrier 20 includes a shutter panel which can undergo a transition between a light-transmitting state and a light-blocking state on a microregion-by-microregion basis. Examples of the shutter panel include, in addition to the liquid crystal panel, a MEMS panel incorporating a MEMS (Micro Electro Mechanical System) shutter. The shutter panel is also referred to as "second panel".

Figure 8:
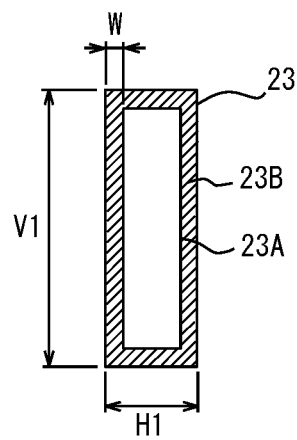
FIG. 8 is a view showing a constructional example of the subpixel.

As shown in FIG. 8, the subpixel 23 may include a shutter portion 23A and a black matrix 23B. The shutter portion 23A allows light to pass therethrough when controlled into an opened state, and blocks light when controlled into a closed state. When the shutter portion 23A is in the opened state, the subpixel 23 may exhibit a light transmittance which is greater than or equal to a first predetermined value. When the shutter portion 23A is in the closed state, the subpixel 23 may exhibit a light transmittance which is less than or equal to a second predetermined value.

The black matrix 23B is disposed along the outer periphery of the subpixel 23 for demarcation between the individual subpixels 23. The black matrix 23B blocks light regardless of the state of the shutter portion 23A. The transverse dimension and the longitudinal dimension of the subpixel 23 are designated by H1 and V1, respectively. The black matrix 23B has a width designated by W. The transverse dimension and the longitudinal dimension of the shutter portion 23A are expressed as "(H1−W×2)" and "(V1−W×2)", respectively. Even if the subpixel 23 is changed in size, the width (W) of the black matrix 23B may be left unchanged. In the case where H1 or V1 is increased and W remains unchanged, the area proportion of the black matrix 23B in the entire area of the subpixel 23 is increased. An increase in H1 or V1 enhances the light transmittance of the subpixel 23 controlled into the state where the shutter portion 23A is opened.

The display device 10 may be constructed of a liquid crystal panel. The liquid crystal panel serving as the display device 10 is also referred to as "first panel". Each subpixel 11 provided in the first panel is also referred to as "first subpixel". The first subpixels are arranged at a first pitch in the parallax direction. The display device 10 includes a display panel of shutter type which can undergo a transition between a light-transmitting state and a light-blocking state on a microregion-by-microregion basis. Examples of the shutter-type display panel include, in addition to the liquid crystal panel, a MEMS display panel incorporating a MEMS shutter. The shutter-type display panel is also referred to as "first panel".

The liquid crystal panel serving as the barrier 20 is also referred to as "second panel". Each subpixel 23 provided in the second panel is also referred to as "second subpixel". The second subpixels are arranged at a second pitch in the parallax direction. The second subpixel can constitute the light-transmitting region 21 when controlled into the state where the shutter portion 23A is opened. The second subpixel can constitute the light-blocking region 22 when controlled into the state where the shutter portion 23A is closed.

In the case where the second subpixel constitutes the light-transmitting region 21, the larger the second subpixel, the smaller the area proportion of the black matrix 23B in the entire area of the second subpixel. Consequently, the larger the second subpixel, the higher the level of light transmittance in the light-transmitting region 21 constituted by the second subpixel can become.

In an embodiment of the invention, the first panel displays an image including a left-eye image and a right-eye image. The second panel enables the left-eye image and the right-eye image to be projected to the left eye 5L and the right eye 5R, respectively, of the user via the light-transmitting region 21 and the light-blocking region 22. That is, based on the image displayed on the first panel, the second panel produces a parallax image for providing binocular parallax to user's eyes. The optical system 30 enables the parallax image to be provided in enlarged dimension to user's eyes.

In these embodiments, in the case where the barrier pitch (j) and the binocular dot group pitch (2R) are equal, the second subpixel can be increased in size. This makes it possible to enhance the light transmittance of the second panel.

As illustrated in FIG. 4, by way of comparative example, it is assumed that a parallax image is projected to user's eyes without using the optical system 30 that permits parallax image enlargement. In the comparative example, in the case where the distance P is OVD, the relationship defined by the earlier described expression (2) is satisfied. According to the expression (2) wherein P and g are positive numbers, a relationship given as: j<2R is satisfied. That is, in the case where a parallax image is projected to user's eyes without using the optical system 30, the fulfillment of such a relationship that the barrier pitch is smaller than the binocular dot group pitch is set as the condition necessary for the monocular dot groups to be arranged with no mutual overlap in the X-axis direction.

On the other hand, in the head-up display 1 according to the embodiment, in the case where the relationship defined by the expression (14) or the expression (15) is satisfied, a relationship given as: j=2R is satisfied. That is, in the case where a parallax image is projected to user's eyes without using the optical system 30, the fulfillment of such a relationship that the barrier pitch is equal to the binocular dot group pitch is set as the condition necessary for the monocular dot groups to be arranged with no mutual overlap in the X-axis direction.

The binocular dot group is constituted by a cluster of the first subpixels. In this case, the binocular dot group pitch is equal to a natural-number multiple of the first pitch. The light-transmitting region 21 and the light-blocking region 22 of the barrier 20 are constituted by a cluster of the second subpixels. In this case, the barrier pitch is equal to a natural-number multiple of the second pitch.

In the comparative example, the barrier pitch is smaller than the binocular dot group pitch. Provided that the binocular dot group pitch is equal to a natural-number multiple of the first pitch and that the barrier pitch is equal to a natural-number multiple of the second pitch, then, as a rule, the second pitch is smaller than the first pitch. That is, the second subpixel is smaller than the first subpixel. In this case, the first panel and the second panel that differ in pitch from each other can be said to include different pixel configurations.

On the other hand, in the embodiment, in the case where the barrier pitch is equal to the binocular dot group pitch, the second subpixel is equal in size to the first subpixel. In this case, the first panel and the second panel are identical in pixel configuration with each other. The first panel may be provided with a color filter for representing different colors, namely R (Red), G (Green), and B (Blue), in a displayed image. There is no need for the second panel to include a color filter. The second panel may exhibit a higher level of light transmittance without being provided with a color filter. In the case where the first panel and the second panel are identical in pixel configuration with each other, other constituent components than the color filter can be shared between the first panel and the second panel. That is, as contrasted to the comparative example, the use of the pixel configuration which the first panel and the second panel have in common can lower the cost of the constituent components.

It is assumed that the comparative example and the embodiment are identical in first subpixel size with each other. Under this assumption, according to a comparison of the size of the first subpixel and the size of the second subpixel, the second subpixel of the embodiment is larger than the second subpixel of the comparative example. In the case where the second subpixel constitutes the light-transmitting region 21, the light transmittance of the second subpixel of the embodiment is greater than the light transmittance of the second subpixel of the comparative example. That is, in the embodiment, the fulfillment of such a relationship that the second subpixel is equal in size to the first subpixel enhances the light transmittance of the barrier 20. As a result, it is possible to increase the brightness of a parallax image projected to user's eyes.

The head-up display 1 controls the first panel and the second panel on an individual basis in respect of the binocular dot group pitch and the barrier pitch. Let it be assumed that the first pitch and the second pitch differ from each other. In this case, when setting a value which is m1 times the first pitch equal a value which is m2 times the second pitch and also setting the value which is m1 times the first pitch and the value which is m2 times the second pitch equal j and 2R, respectively, the determination of "m1" and "m2" will be difficult. On the other hand, in the case where the first pitch and the second pitch are equal, it is easy to set a value which is n times the first pitch equal a value which is n times the second pitch. This makes it easy to set the value which is n times the first pitch and the value which is n times the second pitch equal j and 2R, respectively. That is, the barrier pitch (j) and the binocular dot group pitch (2R) can become equal when the first pitch and the second pitch are equal. Note that m1, m2, and n are each a natural number.

In the case where the barrier pitch and the binocular dot group pitch are equal, so long as a parallax image is projected to user's eyes via the optical system 30, the monocular dot groups can be arranged with no mutual overlap in the X-axis direction. This permits reduction in crosstalk in the parallax image.

In the case where the binocular dot group pitch (2R) is equal to the barrier pitch (j), a pitch (R) equal to one half of the binocular dot group pitch and a pitch equal to one half of the barrier pitch (j) are each also referred to as "third pitch". The earlier described expression (14) indicates that the third pitch is calculated on the basis of the gap (g), the focal point (f) of the optical system 30, and the interocular distance (E) of the user. For example, even with variation in interocular distance from user to user, the head-up display 1 determines the third pitch in conformance with the interocular distance of each user on an individual basis, and thus achieves projection of parallax images suited for users.

The earlier described expression (15) indicates that the gap (g) is calculated on the basis of the focal point (f) of the optical system 30, the interocular distance (E) of the user, and the pitch (R) equal to one half of the binocular dot group pitch. For example, in the course of the manufacture of the head-up display 1, a spacing adjustment member such as a spacer may be interposed between the first panel and the second panel. The gap (g) may be determined according to the thickness of the spacer. That is, the thickness of the spacer may be determined on the basis of the focal point (f) of the optical system 30, the interocular distance (E) of the user, and the pitch (R) equal to one half of the binocular dot group pitch.

It can be said that the earlier described expression (14) or expression (15) is satisfied when the optical system 30 functions in an ideal manner, and forms a collimated light beam in the region located toward the positive side in the Z-axis direction shown in FIG. 5. In this case, regardless of the distance (P) from the optical system 30 to user's eyes, the fulfillment of the expression (14) or the expression (15) makes it possible to provide stereoscopic vision even in the case where the barrier pitch and the binocular dot group pitch are equal.

There may be a case where the optical system 30 does not form a collimated light beam in the region located toward the positive side in the Z-axis direction beyond the optical system 30 as shown in FIG. 5. In this case, the condition necessary for stereoscopic vision to be provided when the barrier pitch and the binocular dot group pitch are equal is based not only on the individual parameters in the expression (14) or the expression (15) but also on the distance (P) from the optical system 30 to user's eyes. In this case, for example, the third pitch can be calculated on the basis of not only the gap (g), the focal point (f), and the interocular distance (E), but also the distance (P) from the optical system 30 to user's eyes.

The third pitch may be equal to a natural-number multiple of each of the first pitch and the second pitch. In the display device 10 and the barrier 20, the number of pixels in the monocular dot group or the number of pixels in the light-transmitting region 21 may be determined on the basis of the value R obtained by calculation using the expression (14).

The head-up display 1 according to the embodiment is mountable in a moving body. In the case where the head-up display 1 is mounted in a moving body, users of the head-up display 1 include moving body drivers or operators, and passengers. In a moving body incorporating the head-up display 1, some constituent components of the head-up display 1 can be prepared by the shared use of some devices or components of the moving body. For example, a windshield provided in the moving body may serve also as a constituent component of the head-up display 1. For example, the optical member 30c shown in FIG. 1 may be replaced with the windshield of the moving body.

In the case where the display device 10 includes a shutter-type display panel, a light source device may be included in the display device 10. In this case, in the head-up display 1, the barrier 20 may be located between the shutter-type display panel and the light source device.

The term "moving body" as used in the disclosure includes vehicles, ships, and aircrafts. In the disclosure, the "vehicles" include motor vehicles and industrial vehicles, but are not limited to them, and may also include railroad vehicles, domestic vehicles, and fixed-wing airplanes that run on runways. The "motor vehicles" include passenger automobiles, trucks, buses, motorcycles, and trolleybuses, but are not limited to them, and may also include other vehicles that run on roads. The "industrial vehicles" include industrial vehicles for agriculture and those for construction work. More specifically, the "industrial vehicles" include forklifts and golf carts, but are not limited to them. The "industrial vehicles for agriculture" include tractors, cultivators, transplanters, binders, combines, and lawn mowers, but are not limited to them. The "industrial vehicles for construction work" include bulldozers, scrapers, loading shovels, crane vehicles, dump trucks, and road rollers, but are not limited to them. The "vehicles" also include human-powered vehicles. How to categorize vehicles is not limited to the foregoing. For example, the "motor vehicles" may include industrial vehicle that can run on roads, and, one and the same vehicle may be put in categories. In the disclosure, the "ships" include personal watercrafts, boats, and tankers. In the disclosure, the "aircrafts" include fixed-wing airplanes and rotary-wing airplanes.

The constructions according to the disclosure are not limited to the embodiments described heretofore, and, various modifications and changes may be made. For example, the features such as functions of the constituent components can be rearranged without causing logical inconsistencies. Moreover, for example, constituent components may be assembled into one, or a single component may be divided into pieces.

The drawings for explaining the constructions according to the disclosure are schematic representations. Thus, the dimensional ratios, etc. in the drawings do not necessarily coincide with actual dimensional ratios, etc.

The terms such as "first" and "second" as used in the disclosure are identifiers used merely to draw a distinction between the constituent components. In the disclosure, the components distinguished from each other by the identifiers such as "first" and "second" may have their identifiers interchanged with each other. For example, the first panel and the second panel may have their identifiers, namely "first" and "second", interchanged with each other. The identifiers are interchanged concurrently. The components are distinguishable even after the interchange of their identifiers. The identifiers may be omitted. In the case of omitting the identifiers, the components are distinguished from each other by reference symbols. The description of identifiers such as "first" and "second" in the disclosure shall not be used alone for the interpretation of the order of the components or for the reasoning of the presence of a lesser identifier.

In the disclosure, the X axis, the Y axis, and the Z axis are used for purposes of convenience in illustration, and can thus be interchanged. While the arrangement according to the disclosure has been described on the basis of the rectangular coordinate system including the X axis, the Y axis, and the Z axis, the positional relationship among the constituent components according to the disclosure is not limited to the orthogonal relationship defined by the X-Y-Z rectangular coordinate system.

REFERENCE SIGNS LIST

1: Head-up display
5L: Left eye
5R: Right eye
10: Display device
10Q: Virtual image from display device
11: Subpixel
11L: First region
11R: Second region
12: Pixel
13L: Left-eye visible region
13R: Right-eye visible region
14L: Left-eye shield region
14R: Right-eye shield region
15: Display boundary
20: Barrier
20Q: Virtual image from barrier
21: Light-transmitting region
22: Light-blocking region
23: Subpixel
23A: Shutter portion
23B: Black matrix
25: Control boundary
30: Optical system
30a, 30b, 30c: Optical member
32: Optical path

The invention claimed is:

1. A head-up display, comprising:
a first panel;
a second panel; and
an optical system,
the first panel comprising first subpixels arranged at a first pitch in a parallax direction, in which direction binocular parallax is provided to user's eyes,
the second panel comprising second subpixels arranged at a second pitch in the parallax direction,
the second panel being placed along the first panel,
the second panel being configured to produce, based on an image displayed on the first panel, a parallax image for providing binocular parallax to the user's eyes,
the optical system enabling the parallax image to be provided in enlarged dimension to the user's eyes, the optical system being configured to enlarge the first panel and the second panel, and a first enlargement factor of the first panel is greater than a second enlargement factor of the second panel,
the first pitch and the second pitch being equal to each other.

2. The head-up display according to claim 1, wherein the first panel is configured to display a right-eye image and a left-eye image, which are arranged at a third pitch in the parallax direction, in the first subpixels, the second subpixels of the second panel are configured to form a light-transmitting region and a light-blocking region, which are arranged at the third pitch in the parallax direction, and the third pitch is calculated based on a distance between the first panel and the second panel, a focal point of the optical system, and an interocular distance between the user's eyes.

3. The head-up display according to claim 2, wherein a following expression is satisfied:

$$R = g/f \times E$$

in which g designates the distance between the first panel and the second panel, f designates the focal point of the optical system, E designates the interocular distance between the user's eyes, and R designates a pitch equal to one half of the third pitch.

4. The head-up display according to claim 2, wherein the third pitch is further calculated based on a distance between the optical system and the user's eyes.

5. The head-up display according to claim 2, wherein the third pitch is equal to a natural-number multiple of each of the first pitch and the second pitch.

6. The head-up display according to claim 1, wherein the second subpixels correspond in a one-to-one ratio with the first subpixels.

7. The head-up display according to claim 1, the optical system being configured to enlarge the first panel to form a first virtual image and enlarge the second panel to form a second virtual image, and the first enlargement factor and the second enlargement factor are set such that monocular dot groups in the first virtual image are arranged with no mutual overlap in the parallax direction.

8. A moving body, comprising:

a head-up display comprising a first panel, a second panel, and an optical system, the first panel comprising first subpixels arranged at a first pitch in a parallax direction, in which direction binocular parallax is provided to user's eyes, the second panel comprising second subpixels arranged at a second pitch in the parallax direction, the second panel being placed along the first panel, the second panel being configured to produce, based on an image displayed on the first panel, a parallax image for providing binocular parallax to the user's eyes, the optical system enabling the parallax image to be provided in enlarged dimension to the user's eyes, the optical system being configured to enlarge the first panel and the second panel, and a first enlargement factor of the first panel is greater than a second enlargement factor of the second panel, the first pitch and the second pitch being equal to each other.

9. The moving body according to claim 8, wherein the second subpixels correspond in a one-to-one ratio with the first subpixels.

10. The moving body according to claim 8, the optical system being configured to enlarge the first panel to form a first virtual image and enlarge the second panel to form a second virtual image, and the first enlargement factor and the second enlargement factor are set such that monocular dot groups in the first virtual image are arranged with no mutual overlap in the parallax direction.

11. A display device for head-up display, comprising:

a first panel; and a second panel, the first panel comprising first subpixels arranged at a first pitch in a first direction, the second panel comprising second subpixels arranged at a second pitch in the first direction, the second panel being placed along the first panel such that a gap is between the first panel and the second panel, a distance of the gap being determined based on an interocular distance between a user's eyes, the first pitch, and a focal point of an optical system with which the display device is configured to be used, the gap being configured to cause the optical system to enable the parallax image to be provided in enlarged dimension to the user's eyes and to cause the optical system to enlarge the first panel at a first enlargement factor and the second panel at a second enlargement factor, the first enlargement factor being greater than the second enlargement factor, the second panel being configured to produce, based on an image displayed on the first panel, a parallax image for providing binocular parallax to the user's eyes arranged in the first direction, the first pitch and the second pitch being equal to each other.

12. The display device for head-up display according to claim 11, wherein the second panel comprises no color filter.

13. The display device for head-up display according to claim 11, wherein the second subpixels correspond in a one-to-one ratio with the first subpixels.

14. The display device for head-up display according to claim 11, the first panel being configured to display a right-eye image and a left-eye image, which are arranged at a third pitch in the first direction, in the first subpixels, and the distance of the gap is determined based on the interocular distance between the user's eyes, the first pitch, and the focal point of the optical system with which the display device is configured to be used such that the following expression is satisfied:

$$R = \frac{g}{f} \times E$$

in which g designates the distance of the gap, f designates the focal point of the optical system, E designates the interocular distance between the user's eyes, and R designates a pitch equal to one half of the third pitch.

* * * * *